US012298702B2

(12) United States Patent
Kono et al.

(10) Patent No.: US 12,298,702 B2
(45) Date of Patent: May 13, 2025

(54) IMAGE FORMING APPARATUS

(71) Applicant: FUJIFILM Business Innovation Corp., Tokyo (JP)

(72) Inventors: Hiroyuki Kono, Kanagawa (JP); Manabu Furusato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/443,425

(22) Filed: Feb. 16, 2024

(65) Prior Publication Data

US 2025/0036072 A1 Jan. 30, 2025

(30) Foreign Application Priority Data

Jul. 27, 2023 (JP) ................................ 2023-122889

(51) Int. Cl.
*G03G 15/00* (2006.01)
*G03G 21/16* (2006.01)

(52) U.S. Cl.
CPC ..... *G03G 21/1661* (2013.01); *G03G 21/1619* (2013.01); *G03G 21/1652* (2013.01)

(58) Field of Classification Search
CPC ............... G03G 15/00; G03G 21/1619; G03G 21/1652; G03G 21/1661
USPC .......................................................... 399/110
See application file for complete search history.

(56) References Cited

U.S. PATENT DOCUMENTS

| | | | | |
|---|---|---|---|---|
| 11,774,876 | B2 * | 10/2023 | Fukasawa .......... | G03G 15/0817 399/103 |
| 2007/0230988 | A1 | 10/2007 | Nobe et al. | |
| 2022/0015219 | A1 | 1/2022 | Hamasaki | |

FOREIGN PATENT DOCUMENTS

| | | | |
|---|---|---|---|
| JP | 2018-189811 | A | 11/2018 |
| JP | 2019-211533 | A | 12/2019 |

OTHER PUBLICATIONS

Aug. 12, 2024 Extended European Search Report issued in European Patent Application No. 24158419.2.

* cited by examiner

*Primary Examiner* — Hoan H Tran
(74) *Attorney, Agent, or Firm* — Oliff PLC

(57) ABSTRACT

An image forming apparatus includes a rear frame disposed on a rear side in a housing, the housing allowing access to a component on a front side in the housing, a driving unit that is attached to a front side of the rear frame to drive a toner cartridge, and a substrate assembly that is disposed on a rear side of the rear frame, and connected to the driving unit with a harness.

6 Claims, 10 Drawing Sheets

IMAGE FORMING APPARATUS

CROSS-REFERENCE TO RELATED APPLICATIONS

This application is based on and claims priority under 35 USC 119 from Japanese Patent Application No. 2023-122889 filed Jul. 27, 2023.

BACKGROUND

(i) Technical Field

The present disclosure relates to an image forming apparatus.

(ii) Related Art

Japanese Unexamined Patent Application Publication No. 2019-211533 describes a technology with which a temporary holder assembled to a toner supply unit temporarily holds a harness connector disconnected from a control-substrate-attached connector in an attachment/removal operation of a driving unit to or from an apparatus body for maintenance or in other operations. This technology is designed to improve the workability of attaching or removing a control unit to or from the apparatus body.

SUMMARY

Aspects of non-limiting embodiments of the present disclosure relate to facilitation of attachment or removal of a driving unit compared to a structure where a driving unit is fixed to a rear portion of a rear frame.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a rear frame disposed on a rear side in a housing, the housing allowing access to a component on a front side in the housing; a driving unit that is attached to a front side of the rear frame to drive a toner cartridge; and a substrate assembly that is disposed on a rear side of the rear frame, and connected to the driving unit with a harness.

BRIEF DESCRIPTION OF THE DRAWINGS

Exemplary embodiments of the present disclosure will be described in detail based on the following figures, wherein.

DETAILED DESCRIPTION

Figure 1:
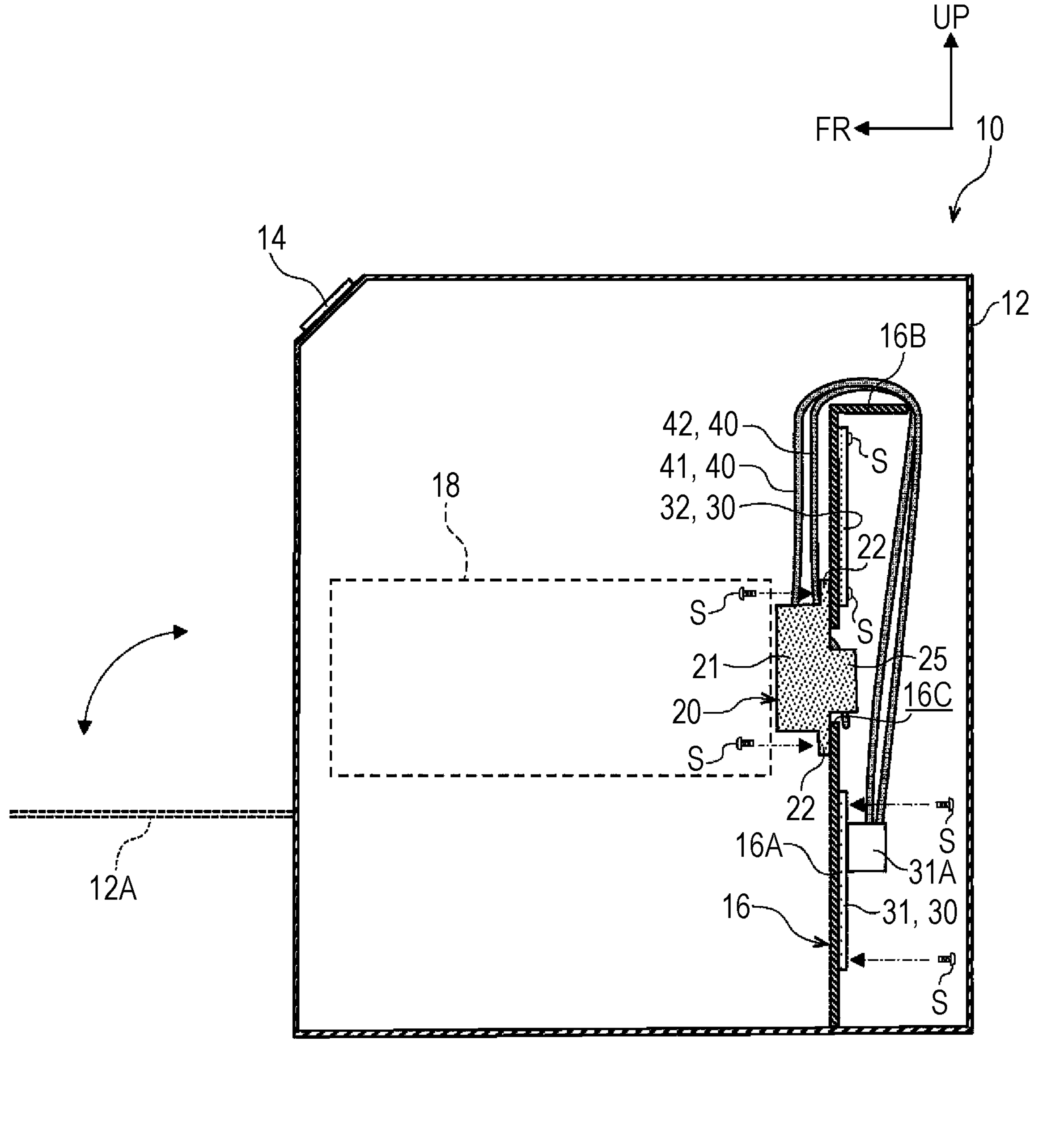
FIG. 1 is a schematic cross-sectional view of a structure of an image forming apparatus according to an exemplary embodiment.

An image forming apparatus according to an exemplary embodiment is described below with reference to the drawings. In an exemplary embodiment, for example, an image forming apparatus forms images with toner of yellow (Y), cyan (C), magenta (M), and black (B). Arrow FR indicated as appropriate in the drawings indicates the front side of the image forming apparatus, arrow UP indicates the upper side of the image forming apparatus, and arrow RH indicates the right side of the image forming apparatus.

Structure of Image Forming Apparatus 10

As illustrated in FIG. 1, an image forming apparatus 10 includes a housing 12. The housing 12 accommodates an image forming portion 18, a rear frame 16, a driving unit 20, a substrate assembly 30, and harnesses 40.

Housing 12

The housing 12 has a rectangular box shape, and has an openable covering 12A on the front side. Opening the covering 12A allows a user to access components installed in the housing 12 from the front side of the image forming apparatus 10.

An operation panel 14 through which the user operates the image forming apparatus 10 is located at an upper portion of the housing 12 on the front side. When the user operates the operation panel 14, the image forming apparatus 10 outputs a recording medium on which an image is formed. Instead, the image forming apparatus 10 may make copies of an original document, or perform authenticating print in response to an operation of the user on the operation panel 14.

Image Forming Portion 18

The image forming portion 18 includes, for example, a toner cartridge (not illustrated). The image forming portion 18 is removable by being accessed from the front side of the image forming apparatus 10. The image forming portion 18 may include an image forming unit (not illustrated) including a photoconductor drum (not illustrated) and a developing device (not illustrated).

Rear Frame 16

As illustrated in FIG. 1, the rear frame 16 is located on a rear side of the image forming apparatus 10. The rear frame 16 includes a longitudinal board 16A and a top board 16B, and has an L-shaped cross section.

Figure 4:
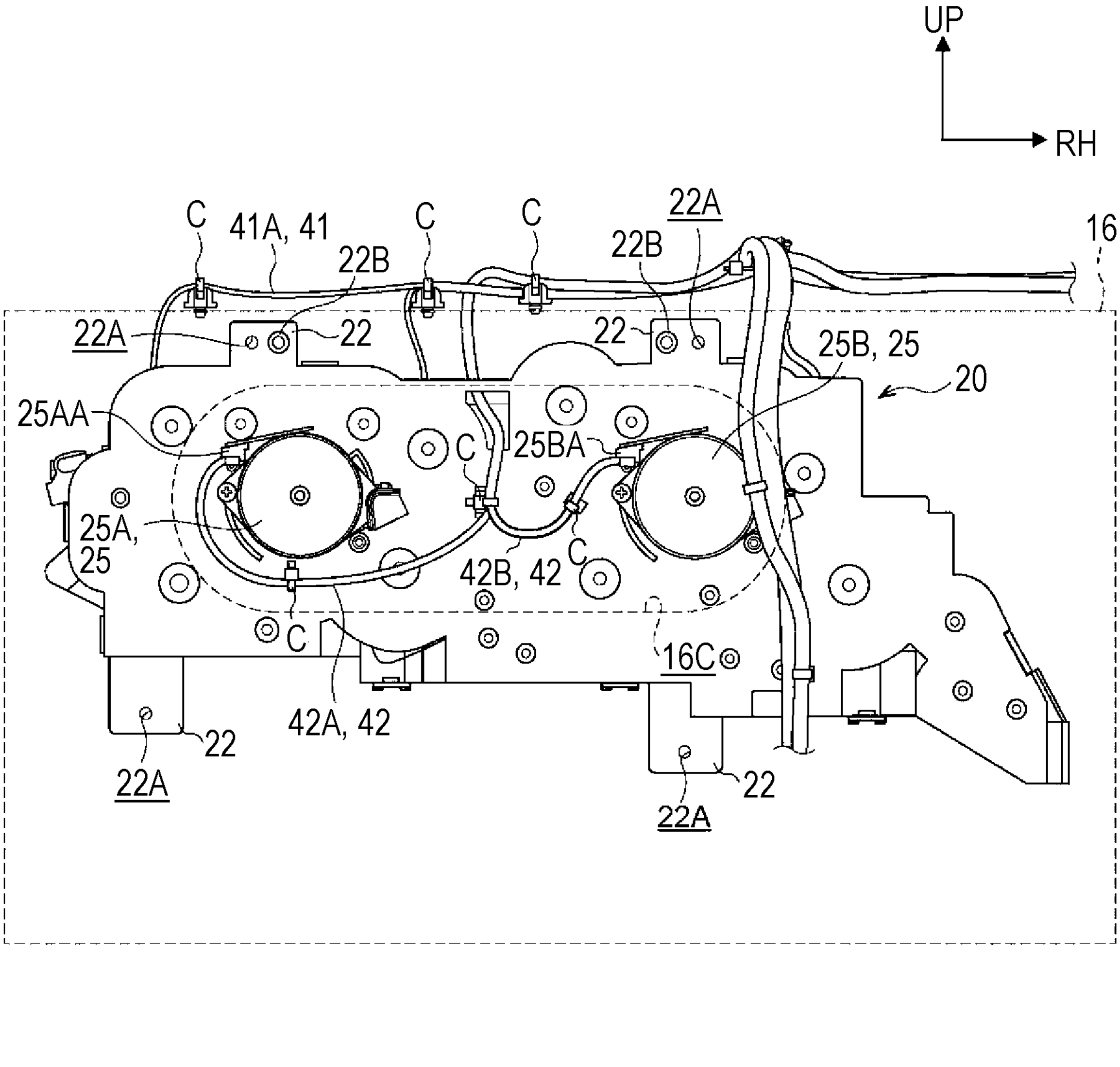
FIG. 4 is a rear view of a driving unit according to an exemplary embodiment.

The longitudinal board 16A has a shape of a rectangular board with a board thickness in the apparatus front-rear direction. As illustrated in FIG. 1 and FIG. 4, the longitudinal board 16A has an opening 16C that is open in the board thickness direction.

Figure 3:
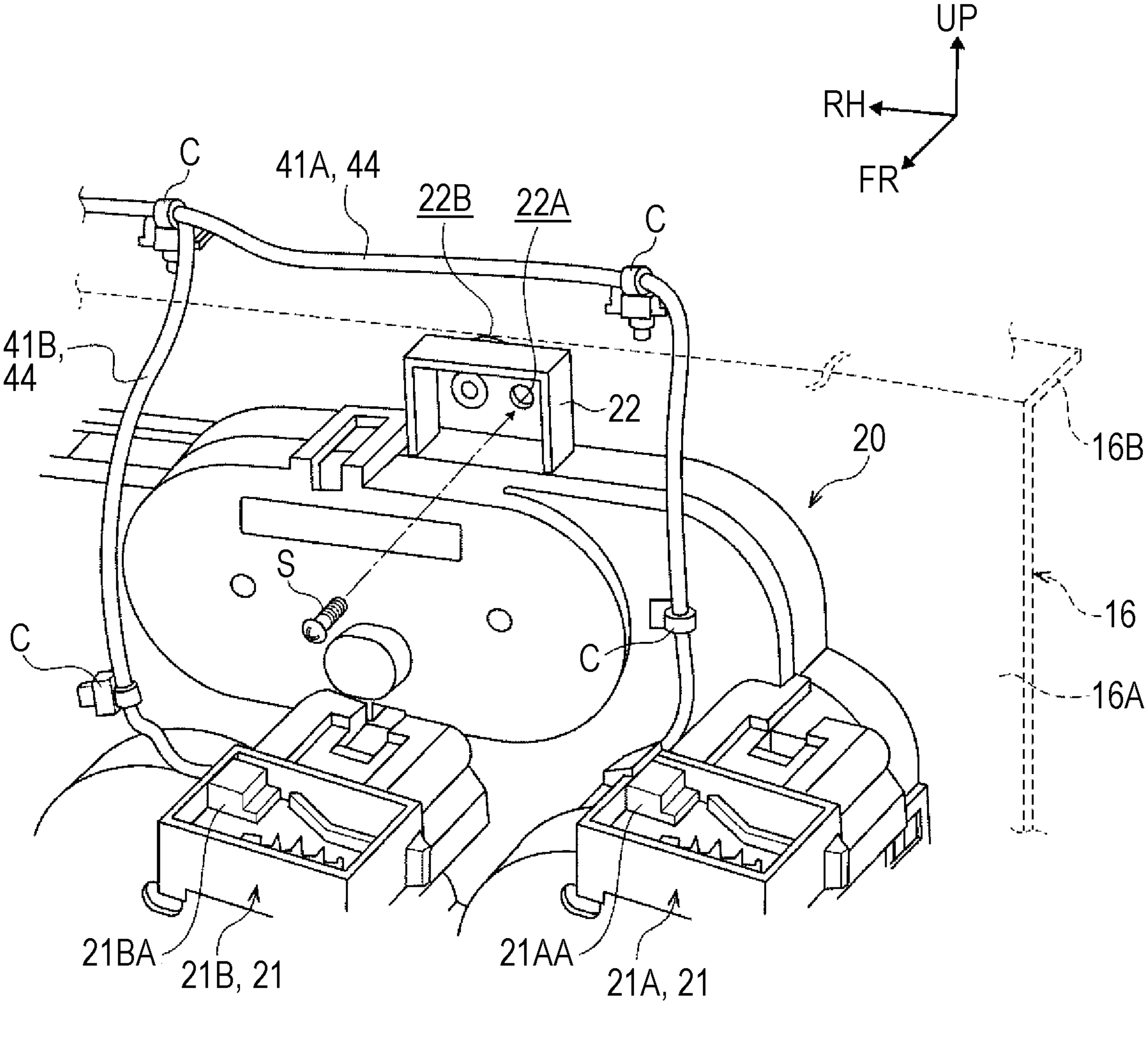
FIG. 3 is a perspective view of a driving unit according to an exemplary embodiment to which harnesses are attached, viewed from the front.

As illustrated in FIG. 1 and FIG. 3, the top board 16B has a shape of a rectangular board having a board thickness in the apparatus top-bottom direction. The longitudinal board 16A and the top board 16B each have multiple through-holes (not illustrated) to which clips C that support the harness 40 are fastened.

Driving Unit 20

As illustrated in FIG. 1, the driving unit 20 is coupled to the image forming portion 18 on the front side of the driving unit 20 to drive the image forming portion 18. When driving, for example, a toner cartridge, the driving unit 20 serves as a dispense unit that transports toner accommodated in the toner cartridge (not illustrated) to a developing device (not illustrated) of the corresponding color.

Figure 2:
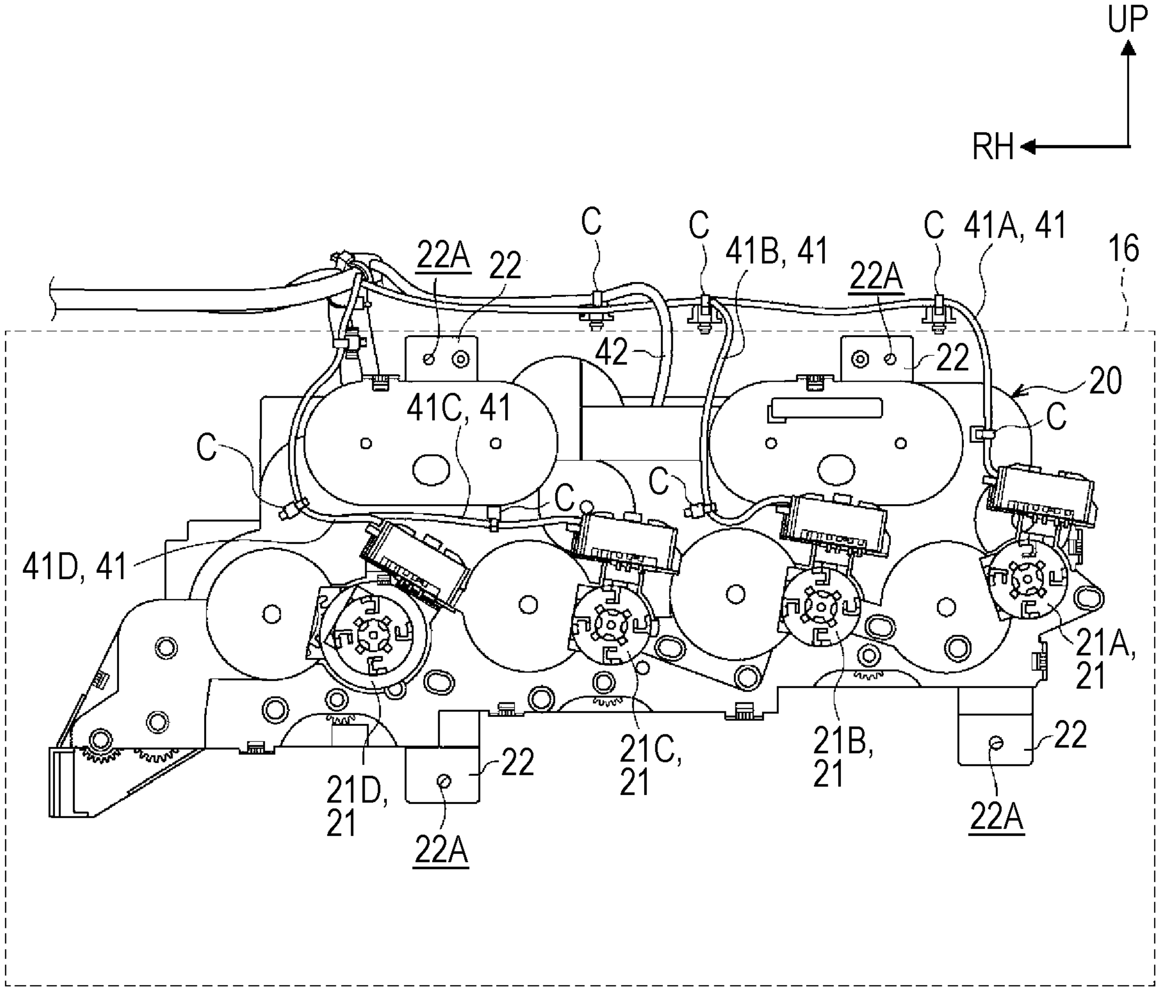
FIG. 2 is a front view of a driving unit according to an exemplary embodiment.

As illustrated in FIG. 1 and FIG. 2, the driving unit 20 is attached to the longitudinal board 16A of the rear frame 16 with screws S serving as example fastening members with attachment mounts 22.

The attachment mounts 22 protrude outward from the outer edge of the driving unit 20. Two attachment mounts 22 protrude upward from an upper portion of the driving unit 20, and two attachment mounts 22 protrude downward from a lower portion of the driving unit 20.

As illustrated in FIG. 3, each attachment mount 22 has a rectangular box shape with the front side open. Each attachment mount 22 has a through-hole 22A in a surface having a board thickness in the apparatus front-rear direction. The through-hole 22A receives a screw S, and the driving unit 20 is thus attached to the rear frame 16. The direction in which the screw S is attached is a rear side direction, and a direction in which the screw S is removed is a frontward direction. The driving unit 20 is attached to the rear frame 16 with the screws S attachable and removable from the front side. Each attachment mount 22 has a rectangular box shape with the front side open, and thus receives the screw S when it falls off.

On the surface of each attachment mount 22 located at an upper portion of the driving unit 20 and having a board thickness in the apparatus front-rear direction, a boss 22B extends rearward. When the boss 22B is received in a through-hole in the rear frame 16, the driving unit 20 has its position fixed relative to the rear frame 16.

As illustrated in FIG. 1, the driving unit 20 includes driving portions 21 that drive the toner cartridges, and motor portions 25 connected to the driving portions 21.

As illustrated in FIG. 2, the driving portions 21 include a first driving portion 21A for driving a toner cartridge of black (B), a second driving portion 21B for driving a toner cartridge of magenta (M), a third driving portion 21C for driving a toner cartridge of cyan (C), and a fourth driving portion 21D for driving a toner cartridge of yellow (Y), which are located on the front side of the driving unit 20.

The first driving portion 21A detects the remaining amount of toner in the toner cartridge for black (B). The second driving portion 21B detects the remaining amount of toner in the toner cartridge for magenta (M). The third driving portion 21C detects the remaining amount of toner in the toner cartridge for cyan (C). The fourth driving portion 21D detects the remaining amount of toner in the toner cartridge for yellow (Y).

Figure 5:
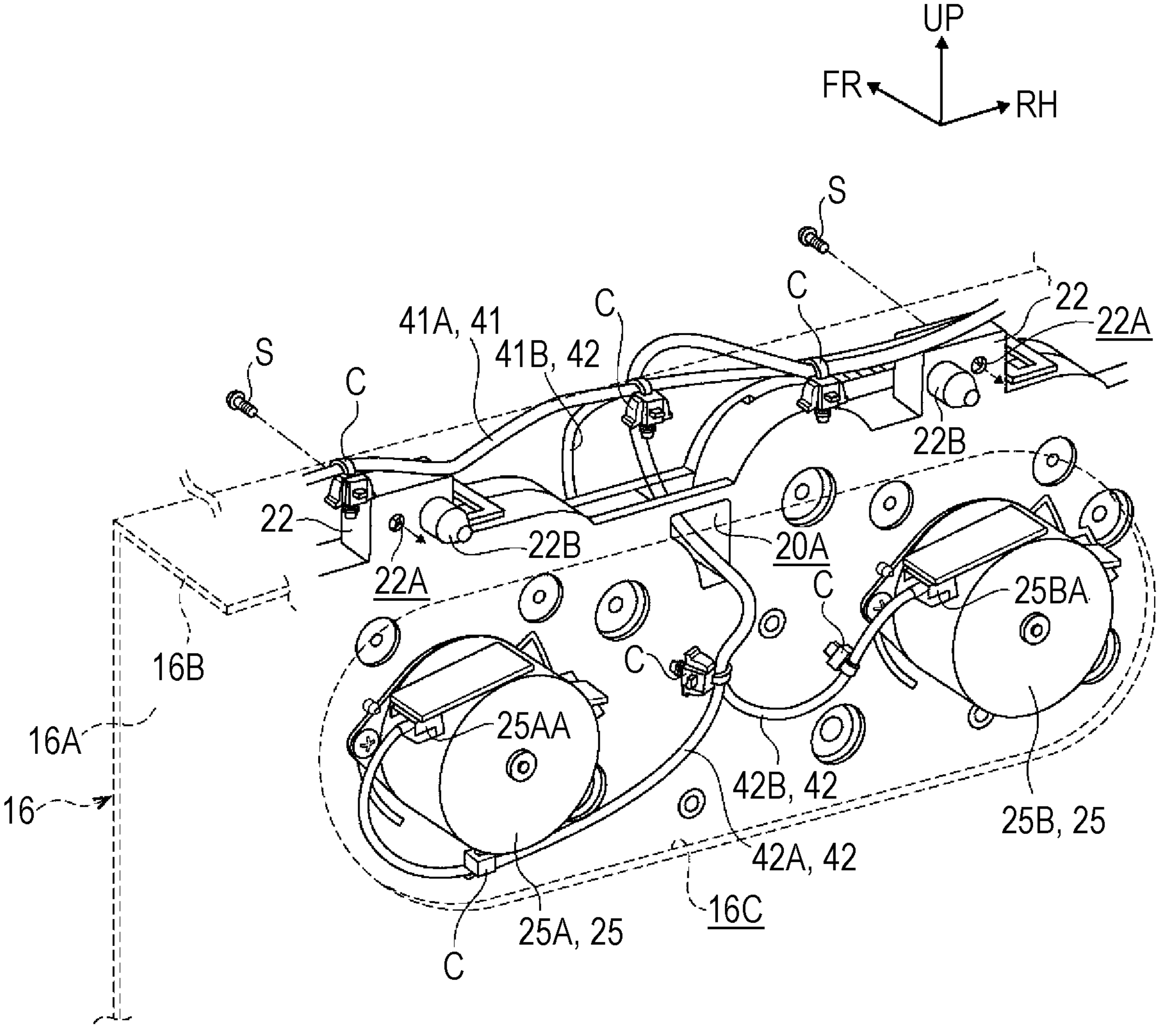
FIG. 5 is a perspective view of a driving unit according to an exemplary embodiment to which harnesses are attached, viewed from the rear.

As illustrated in FIG. 4 and FIG. 5, the motor portions 25 are located on the rear side of the driving unit 20, and includes a first motor portion 25A and a second motor portion 25B.

In the state where the driving unit 20 is attached to the rear frame 16, the motor portions 25 protrude rearward from the opening 16C in the rear frame 16.

Substrate Assembly 30

As illustrated in FIG. 1, the substrate assembly 30 is attached to the rear side of the rear frame 16 with the screws S. The substrate assembly 30 is connected to the driving unit 20 with the harnesses 40. The substrate assembly 30 includes a first substrate 31 and a second substrate 32 disposed above the first substrate 31.

The first substrate 31 includes a receptacle 31A serving as a coupler to which plugs of the harnesses 40 are coupled. Although not illustrated, the second substrate 32 also includes a receptacle serving as a coupler to which plugs of the harnesses 40 are coupled.

Harness 40

As illustrated in FIG. 1, the harnesses 40 include communication harnesses 41 and power supply harnesses 42.

Communication Harnesses 41

The communication harnesses 41 are used for communication of information on the remaining amount of toner in each toner cartridge detected by the corresponding driving portion 21.

As illustrated in FIG. 2, the communication harnesses 41 include a first communication harness 41A, a second communication harness 41B, a third communication harness 41C, and a fourth communication harness 41D.

Figure 6:
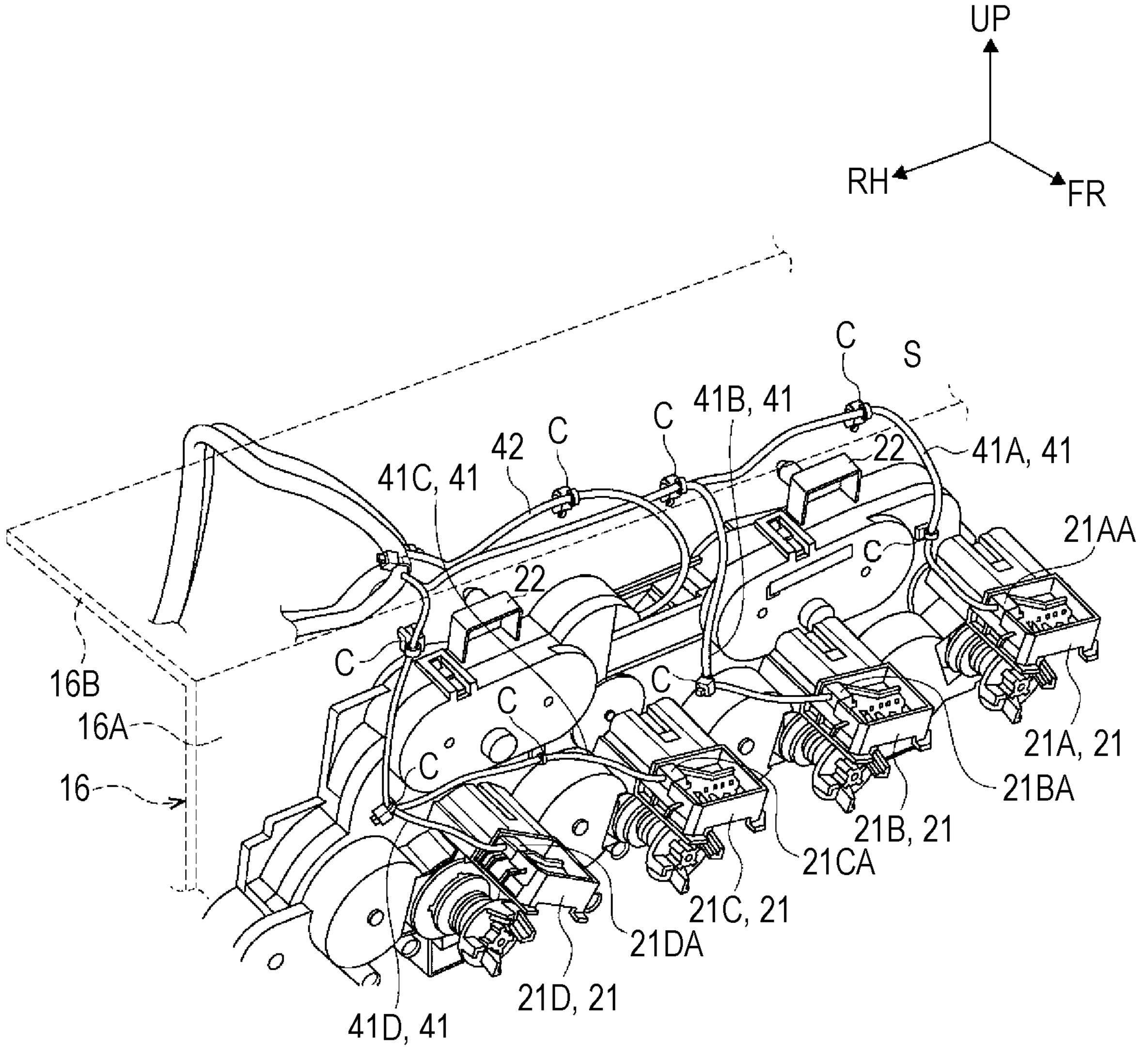
FIG. 6 is a perspective view of harnesses according to an exemplary embodiment in the state where the harnesses are passing over a rear frame.

As illustrated in FIG. 3 and FIG. 6, the first communication harness 41A is, for example, a wire cable, and connects the first driving portion 21A and the first substrate 31 to each other. A plug (not illustrated) of the first communication harness 41A at a first end is connected to a receptacle 21AA in the first driving portion 21A on the apparatus right side. The first communication harness 41A extends to the apparatus right side along the front side surface of the driving unit 20, then to the apparatus upper side, then to the apparatus right side along the upper surface of the top board 16B, and is then drawn out to the rear side of the rear frame 16. The first communication harness 41A is supported by multiple clips C. The clips C are disposed at positions where the first communication harness 41A changes its direction.

The second communication harness 41B is, for example, a wire cable, and connects the second driving portion 21B and the first substrate 31 to each other. A plug (not illustrated) of the second communication harness 41B at a first end is connected to a receptacle 21BA in the second driving portion 21B on the apparatus right side. The second communication harness 41B extends to the apparatus right side along the front side surface of the driving unit 20, then to the apparatus upper side, then to the apparatus right side along the upper surface of the top board 16B, and is then drawn out to the rear side of the rear frame 16. The second communication harness 41B is supported by multiple clips C. The clips C are disposed at positions where the second communication harness 41B changes its direction.

The third communication harness 41C is, for example, a wire cable, and connects the third driving portion 21C and the first substrate 31 to each other. A plug (not illustrated) of the third communication harness 41C at a first end is connected to a receptacle 21CA in the third driving portion 21C on the apparatus right side. The third communication harness 41C extends to the apparatus right side along the front side surface of the driving unit 20, and then to the apparatus upper side, and is then drawn out to the rear side of the rear frame 16 along the upper surface of the top board 16B. The third communication harness 41C is supported by multiple clips C. The clips C are disposed at positions where the third communication harness 41C changes its direction.

The fourth communication harness 41D is, for example, a wire cable, and connects the fourth driving portion 21D and the first substrate 31 to each other. A plug (not illustrated) of the fourth communication harness 41D at a first end is connected to a receptacle 21DA in the fourth driving portion 21D on the apparatus right side. The fourth communication harness 41D extends to the apparatus right side along the front side surface of the driving unit 20, and then to the apparatus upper side, and is then drawn out to the rear side of the rear frame 16 along the upper surface of the top board 16B. The fourth communication harness 41D is supported by multiple clips C. The clips C are disposed at positions where the fourth communication harness 41D changes its direction.

Power Supply Harnesses 42

The power supply harnesses 42 are used to supply power to the motor portion 25.

As illustrated in FIG. 4, the power supply harnesses 42 include a first power supply harness 42A and a second power supply harness 42B.

As illustrated in FIG. 5, the first power supply harness 42A is, for example, a wire cable, and connects the first motor portion 25A and the first substrate 31 to each other. A plug (not illustrated) of the first power supply harness 42A at a first end is connected to a receptacle 25AA in the first motor portion 25A on the apparatus left side. The first power supply harness 42A extends to below the first motor portion 25A along the rear side surface of the driving unit 20, and then to the apparatus upper side, and is then drawn to the front side of the longitudinal board 16A through an opening 20A in the driving unit 20. The first power supply harness 42A then extends to the apparatus upper side along the front side surface of the longitudinal board 16A, and then to the apparatus right side along the upper surface of the top board 16B, and is then drawn out to the rear side of the rear frame 16. The first power supply harness 42A is supported by multiple clips C.

The second power supply harness 42B is, for example, a wire cable, and connects the second motor portion 25B and the first substrate 31 to each other. A plug (not illustrated) of the second power supply harness 42B at a first end is connected to a receptacle 25BA in the second motor portion 25B on the apparatus left side. The second power supply harness 42B is bent to an apparatus lower side along the rear side surface of the driving unit 20, then extends to the apparatus upper side, and is then drawn to the front side of the longitudinal board 16A through the opening 20A in the driving unit 20. The second power supply harness 42B then extends to the apparatus upper side along the front side surface of the longitudinal board 16A, and then to the apparatus right side along the upper surface of the top board 16B, and is then drawn out to the rear side of the rear frame 16. The second power supply harness 42B is supported by multiple clips C.

The first communication harness 41A, the second communication harness 41B, the third communication harness 41C, the fourth communication harness 41D, the first power supply harness 42A, and the second power supply harness 42B are bundled at a middle portion of the upper surface of the top board 16B in an apparatus width direction, and are drawn to the rear side of the rear frame 16. The communication harnesses 41 and the power supply harnesses 42 are connected to the substrate assembly 30 while passing over the upper end of the rear frame 16.

In the state where the image forming portion 18 is removed, the communication harnesses 41 and the power supply harnesses 42 extend in the vertical direction at positions visually identifiable from the front side. In the state where the image forming portion 18 is removed, the communication harnesses 41 are supported by the attachable and removable clips C at positions visually identifiable from the front side. In the state where the image forming portion 18 is removed, a preferable example of the position visually identifiable from the front side may be the apparatus upper side of the rear frame 16.

The communication harnesses 41 are connected to the driving portions 21 in the same direction. The power supply harnesses 42 are connected to the driving portions 21 in the same direction. The direction in which the communication harnesses 41 are connected to the driving portions 21 is opposite to the direction in which the power supply harnesses 42 are connected to the driving portions 21.

Method for Removing Driving Unit 20

Figure 7:
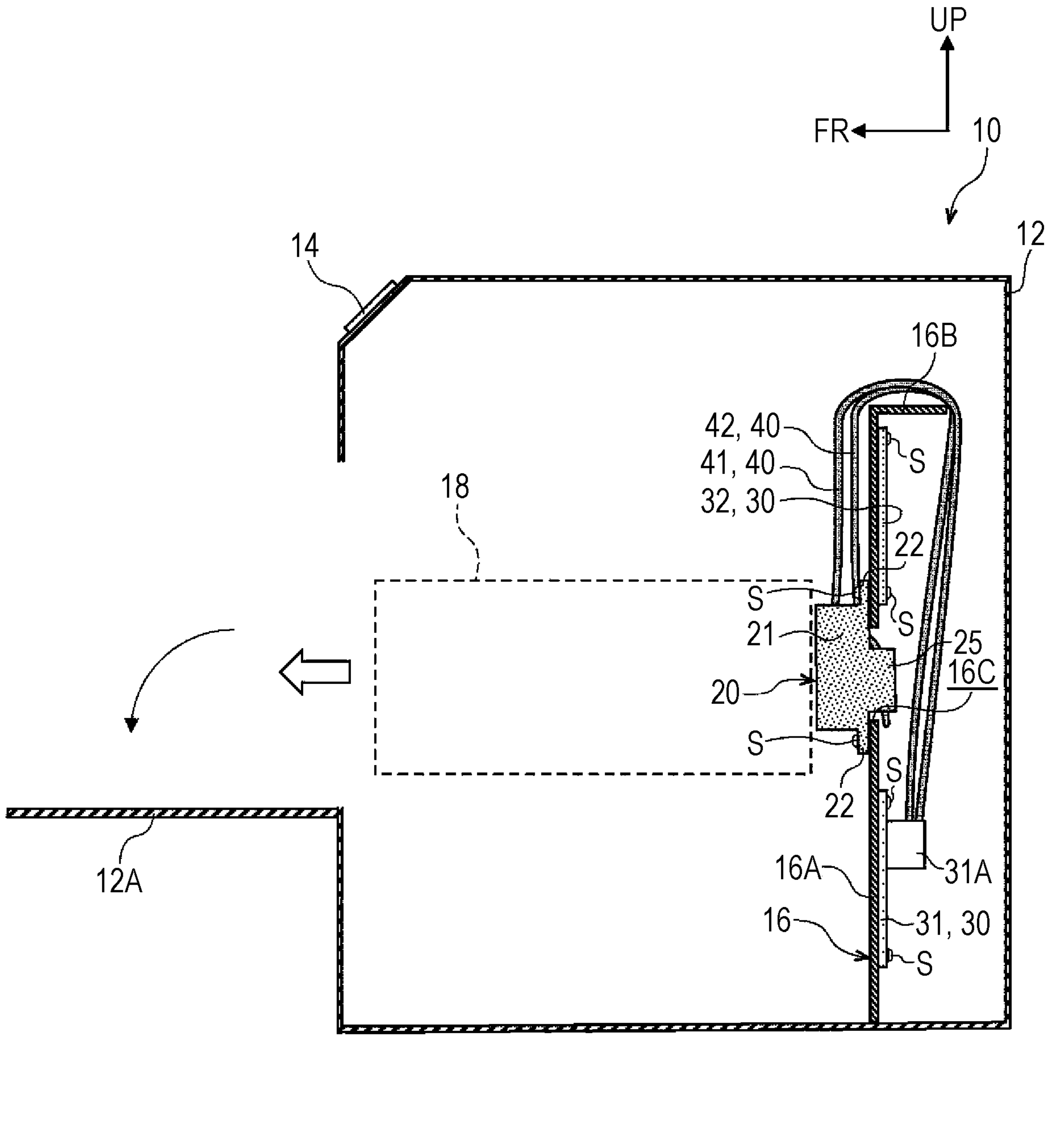
FIG. 7 is a diagram illustrating a procedure of removing a driving unit according to an exemplary embodiment.

As illustrated in FIG. 7, the user opens the covering 12A of the housing 12. The user then accesses the inside of the housing 12 from the front side to draw the image forming portion 18 to the front side to remove.

Figure 8:
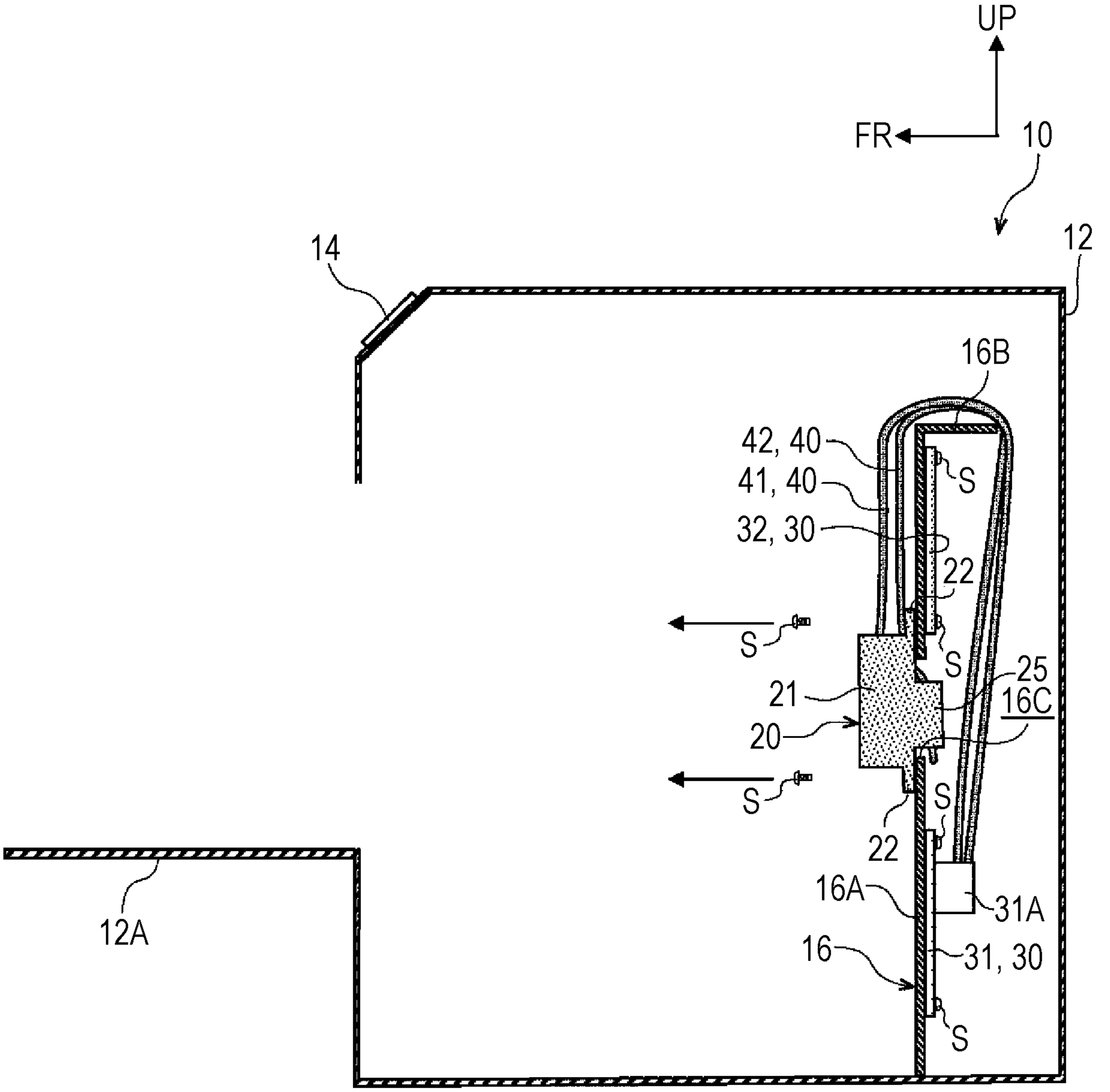
FIG. 8 is a diagram illustrating a procedure of removing a driving unit according to an exemplary embodiment.

As illustrated in FIG. 8, the user then accesses the inside of the housing 12 from the front side to unfasten the screws S attached to the driving unit 20.

Figure 9:
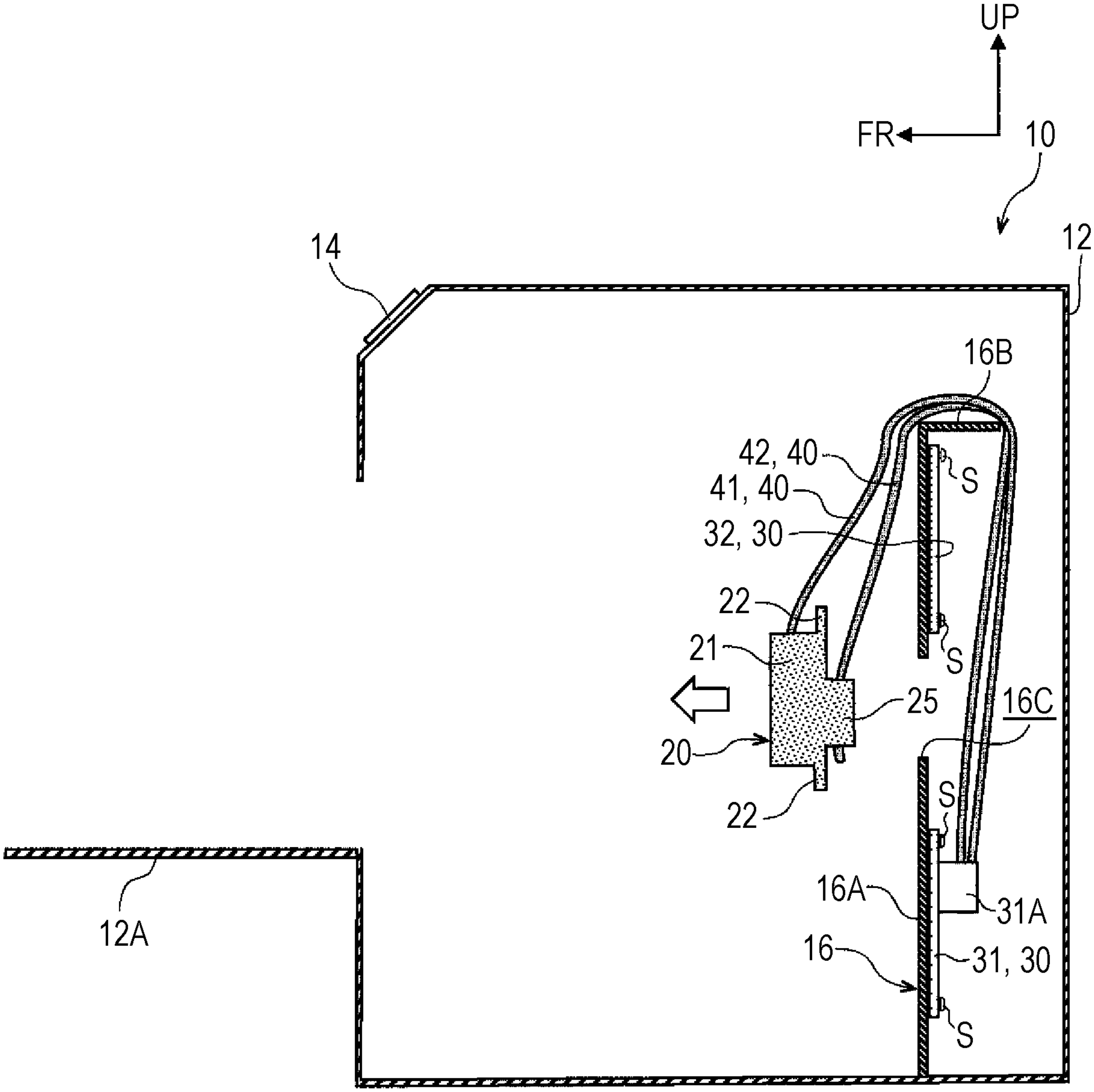
FIG. 9 is a diagram illustrating a procedure of removing a driving unit according to an exemplary embodiment.

As illustrated in FIG. 9, the user then draws the driving unit 20 to the front side. At this time, the user may remove the clips C attached to the harness 40. The user then removes the communication harnesses 41 and the power supply harnesses 42 connected to the driving unit 20 from the driving unit 20.

Figure 10:
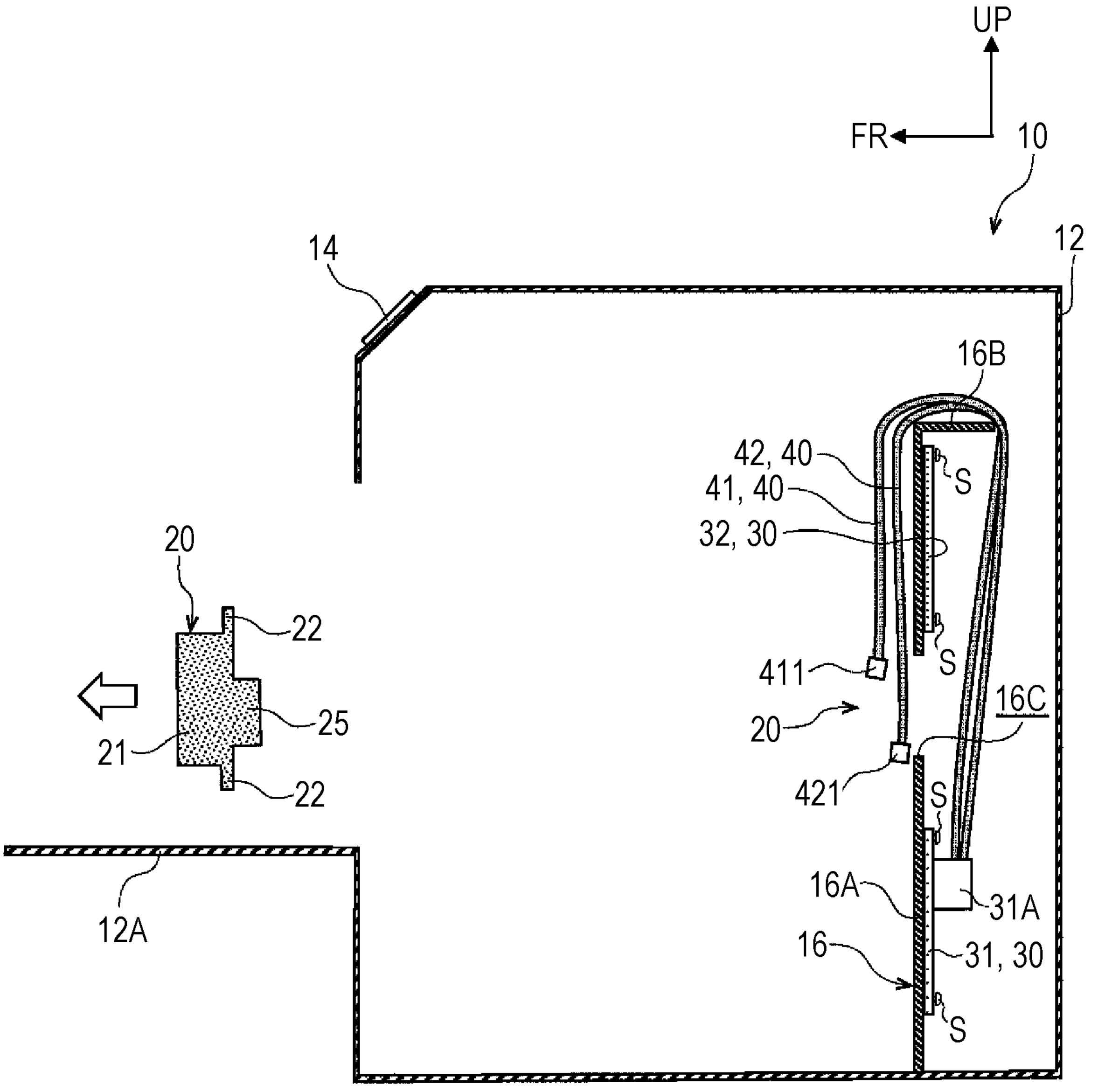
FIG. 10 is a diagram illustrating a procedure of removing a driving unit according to an exemplary embodiment.

As illustrated in FIG. 10, the user then draws the driving unit 20 to the front side to remove the driving unit 20 from the image forming apparatus 10. The communication harnesses 41 and the power supply harnesses 42 are in the state of hanging from the upper end of the rear frame 16. In this state, when the user accesses the inside of the housing 12 from the front side, a plug 411 at the end of each communication harness 41 and a plug 421 at the end of each power supply harness 42 are visually identifiable from the front side.

Operations

To access the driving unit 20 from the rear side for attachment or removal, the substrate assembly 30 is to be removed. In this case, the harnesses 40 connected to the substrate assembly 30 are also to be removed, and the operation may be complex.

The image forming apparatus 10 according to an exemplary embodiment includes the rear frame 16 disposed on the rear side in the housing 12 that allows access to components on the front side, the driving unit 20 that is attached to a front side of the rear frame 16 to drive the toner cartridges, and the substrate assembly 30 that is disposed on a rear side of the rear frame 16 and connected to the driving unit 20 with the harnesses 40 (refer to FIG. 1).

The driving unit 20 that drives the toner cartridges is attached to the front side of the rear frame 16, and thus, accessed from the front side for attachment or removal. Compared to the structure where the driving unit 20 is accessed from the rear side for attachment or removal, this structure reduces an operation of removing the substrate assembly 30 to which the harnesses 40 are connected, and thus facilitates attachment or removal of the driving unit 20.

In the image forming apparatus 10 according to an exemplary embodiment, the harnesses 40 connected to the driving unit 20 extend in the vertical direction at the positions visually identifiable from the front side in the state where the components on the front side of the driving unit 20 are removed (refer to FIG. 2).

The harnesses 40 connected to the driving unit 20 extend in the vertical direction at the positions visually identifiable from the front side in the state where the components on the front side of the driving unit 20 are removed, and thus the positions of the harnesses 40 are more easily visually identifiable than in a structure where the harnesses 40 connected to the driving unit 20 extend in the width direction.

In the image forming apparatus 10 according to an exemplary embodiment, the harnesses 40 connected to the driving unit 20 are connected to the substrate assembly 30 while passing over the upper end of the rear frame 16 (refer to FIG. 6).

The harnesses 40 connected to the driving unit 20 are connected to the substrate assembly 30 while passing over the upper end of the rear frame 16, and thus the positions of the harnesses 40 are visually identified from the front side when an operator accesses the driving unit 20 from the front side to remove. Thus, the positions of the harnesses 40 are more easily visually identifiable than in a structure where the harnesses 40 connected to the driving unit 20 extend through the rear frame 16.

When the driving unit 20 is to be attached, the harnesses 40 are hanging down from the upper end of the rear frame 16. Thus, the positions of the harnesses 40 are more easily visually identifiable than in the case where the harnesses 40 are hanging down from a middle portion of the rear frame 16.

In the image forming apparatus 10 according to an exemplary embodiment, the harnesses 40 connected to the driving unit 20 are supported by the attachable and removable clips C at positions visually identifiable from the front side in the state where the components on the front side of the driving unit 20 are removed (refer to FIG. 2).

The harnesses 40 connected to the driving unit 20 are supported by the attachable and removable clips C at positions visually identifiable from the front side in the state where the components on the front side of the driving unit 20 are removed, and thus the clips C supporting the harnesses 40 are accessible from the front side for attachment or removal.

In the image forming apparatus 10 according to an exemplary embodiment, the driving unit 20 is attached to the rear frame 16 with the attachable and removable screws S from the front side (refer to FIG. 8).

The driving unit 20 is attached to the rear frame 16 with the attachable and removable screws S from the front side, and thus the screws S that attach the driving unit 20 to the rear frame 16 are accessible from the front side for attachment or removal.

In the image forming apparatus 10 according to an exemplary embodiment, the direction in which the screws S are removed is a frontward direction (refer to FIG. 8).

The direction in which the screws S are removed is a frontward direction, and thus a workspace for a tool to attach or remove the screws S is provided on the front side of the driving unit 20. Thus, the screws S are more easily attached and removed than in a structure where the screws S are attached or removed in the vertical direction or the width direction.

As described above, a specific exemplary embodiment of the present disclosure is described above, the present disclosure is not limited to the above exemplary embodiment, and may be modified, changed, or improved in various manners within the scope of the technical idea of the present disclosure.

In the exemplary embodiment, for example, the harnesses 40 include wire harnesses serving as the communication harnesses 41 and wire harnesses serving as the power supply harnesses 42. However, the harnesses are not limited to this aspect, and may be, for example, flat cables.

In the exemplary embodiment, for example, the driving unit 20 is attached to the rear frame 16 with the screws S. However, the driving unit may be attached to the rear frame with other fastening members such as bolts.

In the exemplary embodiment, for example, the covering 12A in the housing 12 is opened to allow the user to access the components installed in the housing 12 from the front side of the image forming apparatus 10. Instead, the housing may be removed to allow the user to access the components installed in the housing from the front side of the image forming apparatus 10.

In the exemplary embodiment, for example, the image forming apparatus 10 outputs recording media on which images are formed. Instead, the image forming apparatus may include a printer, a copying machine, a fax machine, a printing device, or a multifunction device including a combination of two or more of these. The image forming apparatus may have an authenticating print function of allowing print through authentication.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) An image forming apparatus comprising:
- a rear frame disposed on a rear side in a housing, the housing allowing access to a component on a front side in the housing;
- a driving unit that is attached to a front side of the rear frame to drive a toner cartridge; and
- a substrate assembly that is disposed on a rear side of the rear frame, and connected to the driving unit with a harness.

(((2))) The image forming apparatus according to (((1))), wherein a harness connected to the driving unit extends in a vertical direction at a position visually identifiable from a front side in a state where a component on a front side of the driving unit is removed.

(((3))) The image forming apparatus according to (((1))) or (((2))), wherein the harness connected to the driving unit is connected to the substrate assembly while passing over an upper end of the rear frame.

(((4))) The image forming apparatus according to (((2))), wherein the harness connected to the driving unit is supported by an attachable and removable clip at a position visually identifiable from the front side.

(((5))) The image forming apparatus according to any one of (((1))) to (((4))), wherein the driving unit is attached to the rear frame with a fastening member attachable and removable from a front side.

(((6))) The image forming apparatus according to (((5))), wherein a direction in which the fastening member is removed is a frontward direction.

What is claimed is:

1. An image forming apparatus comprising:

a rear frame disposed on a rear side in a housing, the housing allowing access to a component on a front side in the housing;

a driving unit that is attached to a front side of the rear frame to drive a toner cartridge; and a substrate assembly that is disposed on a rear side of the rear frame, and connected to the driving unit with a harness.

2. The image forming apparatus according to claim 1, wherein a harness connected to the driving unit extends in a vertical direction at a position visually identifiable from a front side in a state where a component on a front side of the driving unit is removed.

3. The image forming apparatus according to claim 2, wherein the harness connected to the driving unit is connected to the substrate assembly while passing over an upper end of the rear frame.

4. The image forming apparatus according to claim 2, wherein the harness connected to the driving unit is supported by an attachable and removable clip at a position visually identifiable from the front side.

5. The image forming apparatus according to claim 1, wherein the driving unit is attached to the rear frame with a fastening member attachable and removable from a front side.

6. The image forming apparatus according to claim 5, wherein a direction in which the fastening member is removed is a frontward direction.

* * * * *